United States Patent

Schade

Patent Number: 5,849,853
Date of Patent: Dec. 15, 1998

[54] PREPARATION OF WATER-INSOLUBLE POLYMERS

[75] Inventor: Christian Schade, Ludwigshafen, Germany

[73] Assignee: BASF Aktiengesellschaft, Ludwigshafen, Germany

[21] Appl. No.: 773,310

[22] Filed: Dec. 24, 1996

[30] Foreign Application Priority Data

Jan. 8, 1996 [DE] Germany .................. 196 00 405.5

[51] Int. Cl.⁶ ...................................... C08F 2/20
[52] U.S. Cl. .................. 526/203; 524/460; 526/201; 526/202
[58] Field of Search .................. 526/199, 200, 526/201, 202, 203

[56] References Cited

U.S. PATENT DOCUMENTS

| | | | |
|---|---|---|---|
| 3,684,758 | 8/1972 | Honig | 525/454 |
| 4,148,746 | 4/1979 | Klemmensen et al. | 507/224 |
| 4,318,835 | 3/1982 | Clarke | 526/240 |
| 4,513,111 | 4/1985 | Kishida | 525/310 |
| 4,520,178 | 5/1985 | Sakata | 526/200 |
| 4,625,001 | 11/1986 | Tsubakimoto | 526/88 |
| 4,705,825 | 11/1987 | Symes | 524/734 |
| 4,769,427 | 9/1988 | Nowakowsky | 526/240 |
| 5,563,218 | 10/1996 | Rebre | 526/200 |
| 5,652,309 | 7/1997 | Itoh | 526/317.1 |

FOREIGN PATENT DOCUMENTS 0 597 567 A2   5/1994   European Pat. Off. .

*Primary Examiner*—Paul R. Michl
*Attorney, Agent, or Firm*—Oblon, Spivak, McClelland, Maier & Neustadt, P.C.

[57] ABSTRACT

Water-insoluble polymers are prepared by free radical polymerization of ethylenically unsaturated monomers by a process in which the polymerization is carried out in an aqueous gel phase having a viscosity of at least 800 mPa.s and the gel former has a molecular weight of more than 20,000. The dispersions obtained have a long shelf life and the polymer can be readily precipitated.

17 Claims, No Drawings

PREPARATION OF WATER-INSOLUBLE POLYMERS

The present invention relates to a process for the preparation of water-insoluble polymers by free radical polymerization of ethylenically unsaturated monomers.

Aqueous polymer dispersions or water-insoluble polymers are very widely used nowadays. They are usually prepared by free radical emulsion or suspension polymerization. Dispersants, such as protective colloids or emulsifiers, must be added in order for the polymerization to succeed. These influence the monomer/water and polymer/water interface, determine the shape and size of the resulting particles within certain limits and prevent coagulation of the polymers by forming around the polymer particles a protective layer which prevents the particles from approaching one another to within a distance at which coalescence can occur.

However, the dispersants remain in the polymer dispersion and, depending on the intended use, thus give rise to considerable disadvantages. They may have an adverse effect on the surface properties and adhesion properties of a film formed from the polymers and may make it more difficult to isolate the polymers from the dispersion. A large number of attempts have been made to use less disadvantageous dispersants. In particular, the intention was to avoid the use of low molecular weight emulsifiers.

US-A-4,151,143 describes emulsifier-free polymers which are prepared by a two-stage emulsion polymerization. In the first stage, a conventional carboxyl-containing polymer is prepared by solution or block polymerizaton. The polymer is then dispersed in water by partial or complete neutralization with an organic amine or a base and by the use of a strong shearing action. In the second stage, a mixture of monomers, some of which are water-soluble and some of which are water-insoluble, is added to this dispersion, together with an initiator. After the initiation, the polymerization of the monomers takes place in the dispersion in such a way that grafting occurs and a stable emulsion is formed without an emulsifier.

EP-A-597567 describes large polymer particles which are obtained by emulsion polymerization and may be spherical or rod-shaped. The emulsion polymerization is carried out by polymerizing at least one ethylenically unsaturated monomer in the presence of a stabilizer system. The stabilizer system is a polymeric, amphiphilic stabilizer which comprises both hydrophobic and hydrophilic segments. The polymeric stabilizer is prepared from monomers, such as acrylic acid, methacrylic acid, maleic acid, fumaric acid, N,N-dimethylaminoethyl methacrylate, N,N-dimethylaminoethyl acrylate, etc. The molecular weight of the polymeric stabilizer is from 1000 to 1500, it being pointed out that stabilizers having a higher molecular weight are disadvantageous because, during the neutralization, they result in an excessively high viscosity and are no longer sufficiently soluble in water. However, it has been found that methods proposed to date in the prior art for avoiding the addition of an emulsifier are unsatisfactory particularly with regard to the shelf-life of the resulting polymer dispersions and the ease of isolation of the polymers.

It is an object of the present invention to provide a process for the preparation of water-insoluble polymers by free radical emulsion polymerization, which process can be carried out without the addition of an emulsifier and gives a polymer dispersion having a long shelf life. In addition, the polymer obtained should be easy to isolate.

We have found, surprisingly, that this object is achieved if the polymerization is carried out in a thickened aqueous gel phase.

The present invention therefore relates to a process for the preparation of water-insoluble polymers by free radical polymerization, in particular emulsion polymerization, of ethylenically unsaturated monomers, wherein the polymerization is carried out in an aqueous gel phase having a viscosity of at least 800 mPa.s, the gel former having an average molecular weight of more than 20,000.

The present invention also relates to the polymer dispersions obtainable by the process.

The Gel Phase

The gel former may be a polymer of natural or synthetic origin.

Preferred gel formers of natural origin are alginates, pectins, guar gum, carrageenates, cellulose and cellulose derivatives, such as carboxymethylcelluloses and hydroxyethylcelluloses, and starch and starch derivatives, such as oxidized starch, carboxymethyl starch and hydroxyethyl starch.

However, carboxyl-carrying polymers of synthetic origin are preferably used. These are polymers or copolymers which are obtained by free radical polymerization and are preferably composed of:

a) at least one carboxyl-carrying monomer, b) if required, at least one $C_1$–$C_{30}$-alkyl(meth)acrylate, c) if required, at least one crosslinking agent, d) if required, at least one further monoethylenically unsaturated monomer and e) if required, at least one monoethylenically unsaturated monomer, which has a water miscibility of at least 1% by weight at 25° C. and has at least one alkyl group of 12 or more carbon atoms.

The monomers (a) are preferably monoethylenically unsaturated, aliphatic $C_3$–$C_8$-carboxylic acids, their anhydrides or mixtures of the carboxylic acids and anhydrides. Examples of suitable carboxylic acids are acrylic acid, methacrylic acid, maleic acid, fumaric acid, itaconic acid and crotonic acid. Examples of suitable anhydrides are methacrylic anhydride and maleic anhydride. Preferred monomers (a) are acrylic acid, methacrylic acid, maleic acid and/or maleic anhydride.

The monomers (a) are present in the gel-forming polymer in general in an amount of from 20 to 100, preferably from 35 to 99.95, particularly preferably from 85 to 99.95, % by weight, based on the total weight of the polymer. If the monomer (a) is maleic anhydride, it is preferably present in an amount of from 50 to 65% by weight.

The monomers (a) may be incorporated as free acid, anhydride or salt in the gel-forming polymer.

The monomers (b) are esters of acrylic acid or methacrylic acid with saturated, linear or branched $C_1$–$C_{30}$-alcohols. Examples of such esters are methyl, ethyl, n-propyl, n-butyl, tert-butyl, n-hexyl, n-octyl, n-decyl, n-dodecyl, n-tetradecyl, n-hexadecyl, n-heptadecyl, n-octadecyl, n-nonadecyl, n-eicosadecyl, n-docosyl, n-tetracosyl, 2-ethylhexyl or cyclohexyl acrylate or methacrylate. Mixtures of the stated monomers may also be used. $C_1$-, $C_2$-, $C_4$- and/or $C_{12}$–$C_{22}$-alkyl acrylates or methacrylates are preferably used.

The monomers (c) may be present in the gel-forming polymer in amounts of from 0.1 to 80% by weight. $C_{12}$–$C_{22}$-Alkyl acrylates or methacrylates are preferably present in amounts of from 0.1 to 10, in particular from 0.5 to 5, % by weight. $C_1$-, $C_2$- or $C_4$-Alkyl acrylates or methacrylates are preferably present in amounts of from 30 to 65% by weight.

The crosslinking agents (c) contain at least two monoethylenically unsaturated double bonds in the molecule.

Suitable crosslinking agents of this type are, for example, acrylates, methacrylates, allyl ethers or vinyl ethers of at least dihydric alcohols. Some or all of the OH groups of the parent alcohols may be etherified or esterified; however, the crosslinking agents contain at least two ethylenically unsaturated groups. Examples of the parent alcohols are dihydric alcohols, such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentylglycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, mononeopentylglycol hydroxypivalate, 2,2-bis(4-hydroxyphenyl)propane, 2,2-bis[4-(2-hydroxypropyl)phenyl]propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiopentane-1,5-diol and polyethylene glycols, polypropylene glycols and polytetrahydrofurans, each having molecular weights of from 200 to 10,000. In addition to homopolymers of ethylene oxide or propylene oxide, block copolymers of ethylene oxide or propylene oxide or copolymers incorporating the ethylene oxide and propylene oxide groups may also be used. Examples of parent alcohols having more than two OH groups are trimethylol propane, glycerol, pentaerythritol, 1,2,5-pentanetriol, 1,2,6-hexanetriol, triethoxycyanuric acid, sorbitan, and sugars, such as sucrose, glucose and mannose. The polyhydric alcohols may also be used as the corresponding ethoxylates or propoxylates, after reaction with ethylene oxide or propylene oxide.

Further suitable crosslinking agents are the vinyl esters or the esters of monohydric, unsaturated alcohols with ethylenically unsaturated $C_3$–$C_6$-carboxylic acids, for example acrylic acid, methacrylic acid, itaconic acid, maleic acid or fumaric acid. Examples of such alcohols are allyl alcohol, 1-buten-3-ol, 5-hexen-1-ol, 1-octen-1-ol, 9-decen-1-ol, dicyclopentenyl alcohol, 10-undecen-1-ol, cinnamyl alcohol, citronellol, crotyl alcohol or cis-9-octadecen-1-ol. However, the monohydric, unsaturated alcohols may also be esterified with polybasic carboxylic acids, for example malonic acid, tartaric acid, trimellitic acid, phthalic acid, terephthalic acid, citric acid or succinic acid.

Further suitable crosslinking agents are esters of unsaturated carboxylic acid with the polyhydric alcohols described above, for example of oleic acid, crotonic acid, cinnamic acid or 10-undecanoic acid.

Also suitable are straight-chain or branched, linear or cyclic, aliphatic or aromatic hydrocarbons which have at least two double bonds, which may not be conjugated in the case of aliphatic hydrocarbons, e.g. divinylbenzene, divinyltoluene, 1,7-octadiene, 1,9-decadiene, 4-vinyl-1-cyclohexene, trivinylcyclohexane or polybutadienes having molecular weights of 200–20,000. Other suitable crosslinking agents are the acrylamides or methacrylamides of at least difunctional amines. Such amines are, for example, 1,2-diaminomethane, 1,2-diaminoethane, 1,3-diaminopropane, 1,4-diaminobutane, 1,6-diaminohexane, 1,12-didecanediamine, piperazine, diethylenetriamine and isophoronediamine. The amides of allylamine and unsaturated carboxylic acids, such as acrylic acid, methacrylic acid, itaconic acid, maleic acid or at least dibasic carboxylic acids, as described above, are also suitable.

N-Vinyl compounds of urea derivatives, at least difunctional amides, cyanurates or urethanes, for example of urea, ethyleneurea, propyleneurea or tartaramide, are also suitable.

Further suitable crosslinking agents are divinyldioxane, diallyl phosphate, triallyl phosphate, triallyl triazinetrione, diallylamine, triallylamine, tetraallylsilane, tetravinylsilane, hexaallyltrimethylenegrisulfone, butadiene and isoprene.

Preferred crosslinking agents are (meth)acrylates of $C_2$–$C_6$-diols, allyl ethers of polyhydric alcohols, for example of trimethylolpropane, pentaerythritol, sucrose or sorbitol, having more than one allyl ether function in the molecule, methacrylates of unsaturated $C_3$–$C_{22}$-alcohols, trivinylcyclohexane and/or nonconjugated $C_6$–$C_{14}$-alkadienes and divinyl glycol. The crosslinking agents may be used in amounts of from 0.05 to 10, preferably from 0.05 to 5, particularly preferably from 0.1 to 3, % by weight.

Monoethylenically unsaturated monomers (d) are preferably the following compounds:

a) N-Vinyl compounds of the formula

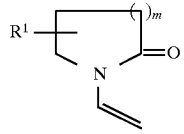

where $R^1$ is hydrogen or $C_1$–$C_{12}$-alkyl and m is 1, 2 or 3.
Examples of such compounds are N-vinylpyrrolidone and N-vinylcaprolactam.

b) N-Vinylimidazol, which may be substituted by $C_1$–$C_{12}$-alkyl, and 1-vinyl-3-alkylimidazolium salts having 1 to 30 carbon atoms in the alkyl chain.

c) Compounds of the formula

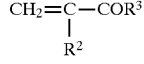

where $R^2$ is H or $CH_3$, $R^3$ is $OR^4NR^5R^6$, $NHR^4NR^5R^6$ or $NR^5R^6$, $R^4$ is $C_2$–$C_{12}$-alkylene and $R^5$ or $R^6$, which may be identical or different, are each hydrogen or $C_1$–$C_{12}$-alkyl, and quaternary ammonium salts thereof.

Examples of such compounds are diethylaminoethyl (meth)acrylamide, diethylaminoethyl (meth)acrylate, dimethylaminoethyl(meth)acrylamide and dimethylaminoethyl (meth)acrylate, acrylamide, methacrylamide, N,N-dimethylacrylamide, N-tert-butylacrylamide, N-tert-octylacrylamide, N-dodecylacrylamide and N-methylundecylacrylamide;

d) Vinyl esters of saturated $C_1$–$C_{30}$-carboxylic acids, such as vinyl acetate, vinyl propionate, vinyl neononoate, vinyl neodecanoate or vinyl laurate;

e) hydroxyalkyl mono(meth)acrylates where the alkylene group is of 2 to 6 carbon atoms, such as hydroxyethyl monomethacrylate and monoacrylate;

f) (meth)acrylates of $C_1$–$C_{22}$-alcohols reacted with from 2 to 50 ethylene oxide units;

g) $C_1$–$C_{22}$-alkyl vinyl ethers, such as vinyl methyl ether or vinyl ethyl ether;

h) acrylamidopropanesulfonic acid, styrenesulfonic acid, sulfoethyl methacrylate or their salts;

i) $C_4$–$C_{30}$-alkenes having a terminal double bond; and styrene, acrylonitrile, methyl vinylketone, vinyl chloride or vinylidene chloride or any desired mixtures of the stated monomers.

Acrylamide, N-vinylpyrrolidone, vinyl acetate, vinyl methyl ether, vinyl ethyl ether, isobutene, diisobutene and $C_{12}$–$C_{22}$-alkenes, such as 1-octadecene, 1-hexadecene and 1-dodecene, are preferred. Very particularly preferably contained monomers (d) are acrylamide, N-vinylpyrrolidone and vinyl methyl ether.

The monomers (d) may be used in an amount of up to 70, preferably up to 10, particularly preferably up to 5, % by weight. Vinyl methyl ether, vinyl ethyl ether, isobutene or diisobutene is particularly preferably present in an amount of from 25 to 50% by weight. Acrylamide and N-vinylpyrrolidone are preferably present in amounts of from 15 to 60% by weight.

The monoethylenically unsaturated monomers (e) are preferably compounds of the formula

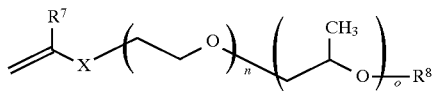

where $R^7$ is H or $CH_3$,
X is —O—, —COO—, —CONH— or $CH_2$—,
$R^8$ is $C_{12}$–$C_{30}$-alkyl,
n is from 1 to 100, and
o is from 0 to 100.

Monomers of the above formula, where $R^7$ is H or $CH_3$,
X is —O—, —COO— or $CH_2$—,
$R^8$ is $C_{12}$–$C_{22}$-alkyl,
n is from 1 to 100 and
o is 0, are particularly preferred.

Further suitable monomers (e) are described in EP-A-632 063, EP-A-296 436, US-A-4,514,552, US-A-4,916,183, US-A-5,013,787, EP-A-335 624, EP-A-413 953, EP-A-446 621, US-A-4,421,902, EP-A-192 724, EP-A-216 479, EP-A-170 025 and EP-A-172 723. The contents of these publications are hereby fully incorporated by reference.

The monomers (e) may be present in the gel-forming polymer preferably in an amount of from 0.1 to 25, in particular from 0.5 to 15, particularly preferably from 2 to 10, % by weight.

The gel-forming polymer has in particular the composition according to one of the following preferred embodiments, the amounts in each case being stated in % by weight:

(1) from 20 to 80% of at least one carboxyl-carrying monomer (a);
from 20 to 80% of at least one monomer (b);
0% of crosslinking agent;
from 0 to 30% of at least one monomer (d) and from 0.1 to 15% of at least one monomer (e).

(2) from 30 to 100% of at least one monomer (a);
from 0 to 20% of at least one monomer (b);
from 0 to 10% of at least one crosslinking agent;
from 0 to 70% of at least one monomer (d); and
0% of monomer (e).

(3) from 20 to 80% of acrylic acid, methacrylic acid, itaconic acid and/or maleic acid;
from 20 to 80% of a $C_1$–$C_8$-alkyl (meth)acrylate;
from 0 to 10% of at least one crosslinking agent;
from 0 to 30% of at least one monomer (b); and
from 0.1 to 15% of a monomer of the formula

where $R^7$ is H or $CH_3$;
X is —O—, —COO— or —$CH_2$—,
$R^8$ is $C_{12}$–$C_{22}$-alkyl and
n is from 1 to 100.

(4) from 80 to 99.9% of acrylic acid, methacrylic acid and/or maleic anhydride;
from 0.05 to 10% of at least one $C_8$–$C_{22}$-alkyl (meth)acrylate;
from 0.05 to 5% of at least one crosslinking agent and
from 0 to 10% of at least one further monomer (d).

(5) from 90 to 99.4% of acrylic acid, methacrylic acid and/or maleic anhydride;
from 0.5 to 5% of at least one $C_8$–$C_{22}$-alkyl (meth)acrylate;
from 0.1 to 5% of at least one crosslinking agent and
from 0 to 5% of at least one monomer (b).

(6) from 95 to 99.95% of acrylic acid, methacrylic acid and/or maleic anhydride and
from 0.05 to 5% of at least one crosslinking agent.

(7) from 40 to 65% of maleic anhydride;
from 35 to 60% of at least one $C_1$–$C_{22}$-alkyl vinyl ether and/or
one $C_6$–$C_{30}$-alk-1-ene and/or isobutene;
from 0 to 5% of at least one crosslinking agent and
from 0 to 10% of at least one monomer (d).

(8) from 40 to 85% of (meth)acrylic acid;
from 15 to 60% of at least one N-vinyllactam and/or one acrylamide;
from 0 to 5% of at least one crosslinking agent and
from 0 to 10% of further monomers (d).

The molecular weight of the gel former is in general greater than 20,000, preferably greater than 50,000, and in particular greater than 100,000.

The preparation of the gel-forming polymers can be carried out by various methods, for example by precipitation polymerization, solution polymerization, emulsion polymerization or reverse emulsion polymerization. They can also be obtained from other polymers by polymer-analagous reaction. The polymers are preferably prepared by precipitation polymerization in organic solvents, solvent mixtures or supercritical $CO_2$, by emulsion copolymerization in water or by reverse emulsion or suspension polymerization in mixtures of water and a water-immiscible liquid.

Suitable gel-forming polymers are commercially available, for example Carbopol®, Synthalen®, Stabylen®, Aqupec®, Stabyleze®, Hivis®, Pemulen®, Lutexal®, Sterocoll®, Latecoll®, Rohagit®, Sanwet®, Salcare®, Antil® or Acrysol®.

The Ethylenically Unsaturated Monomers

The ethylenically unsaturated monomers to be polymerized in the gel phase are those which are usually used in emulsion and suspension polymerizations. They are therefore essentially water-insoluble monomers. They may be used alone or as a mixture with other monomers. The main part of the mixure then comprises the essentially water-insoluble monomers. Smaller amounts of water-insoluble comonomers may also be present.

Suitable essentially water-insoluble monomers are in particular monoethylenically unsaturated monomers, such as olefins, e.g. ethylene, vinyl aromatic monomers, such as styrene, α-methylstyrene, o-chlorostyrene or vinyltoluenes, esters of vinyl alcohol and monocarboxylic acids of 1 to 22 carbon atoms, such as vinyl acetate, vinyl propionate, vinyl n-butyrate, vinyl laurate and vinyl stearate, esters of αβ-monoethylenically unsaturated mono- and dicarboxylic acids of 3 to 6 carbon atoms, such as acrylic acid, methacrylic acid, maleic acid, fumaric acid, and itaconic acid, with alkanols of in general 1 to 30, preferably 1 to 18, and in particular 1 to 12, carbon atoms, e.g. methyl, ethyl, n-butyl, isobutyl and 2-ethylhexyl acrylate and methacrylate, dimethyl maleate or di-n-butyl maleate, nitriles of α,β-monoethylenically unsaturated carboxylic acids, such as acrylonitrile, conjugated $C_{4-8}$-dienes, such as 1,3-butadiene and isoprene, chlorinated and fluorinated alkenes of 1 to 6 carbon atoms, such as vinyl chloride or vinylidene chloride, and N-$C_4$–$C_{30}$-alkyl(meth)acrylamides, such as N-n-butylacrylamide etc.

Water-soluble comonomers are in particular α,β-monoethylenically unsaturated carboxylic acids of 3 to 6 carbon atoms, such as acrylic acid, methacrylic acid, crotonic acid or maleic acid, hydroxyalkyl (meth)acrylates, such as hydroxyethyl (meth)acrylate, dialkylaminoalkyl (meth)acrylates, such as dimethylaminoethyl (meth) acrylate, dialkylaminoalkyl (meth)acrylamides, such as dimethylaminoalkyl (meth)acrylamide, and vinylpyrrolidone, vinylcaprolactam, vinylimidazole, etc.

If necessary, crosslinking agents may also be used. Suitable crosslinking agents were stated above.

Carrying Out the Polymerization

The polymerization is carried out in an aqueous gel phase which is formed by using the gel formers described above. The procedure is carried out in a gel phase having a viscosity of at least 800, preferably at least 1000, in particular at least 1500, particularly preferably at least 2000, mPa.s (measured at 25° C. using a Haake VT-02 hand viscometer). In many cases, a viscosity of at least 5000 and even at least 10,000 or 25,000 mPa.s may be employed.

The gel former is generally used in an amount of from 0.05 to 10, preferably from 0.1 to 5, particularly preferably from 0.1 to 2, % by weight, calculated on the basis of the nonionized gel former and based on the total weight of the aqueous phase.

In general, the gel former is used in the aqueous phase in salt form. The salt form may already be present or may be produced subsequently by adding a base to the aqueous phase. Suitable bases for the formation of the salt form before or after the addition of the gel former to the aqueous phase are, for example, inorganic bases, such as lithium hydroxide, sodium hydroxide, potassium hydroxide, sodium carbonate, potassium carbonate or ammonia, pyridine compounds, amidine compounds or organic amines, such as monoethanolamine, diethanolamine, triethanolamine, dimethylethanolamine, methyldiethanolamine, triethylamine, 2-amino-2-methyl-1-propanol, etc.

The gel phase may also contain further conventional additives, for example emulsifiers, protective colloids, foam stabilizers, preservatives, organic solvents or inorganic solvents. Preferably, however, the gel phase contains no emulsifiers or protective colloids.

The polymerization is carried out by the free radical method and is initiated in a conventional manner with the aid of initiators which are capable of initiating a free radical aqueous polymerization, in particular emulsion polymerization. These may be peroxides, for example alkali metal peroxodisulfates, or azo compounds. Also suitable are redox initiators, ie. combined systems comprising at least one peroxide and/or hydroperoxide, eg. tert-butyl hydroperoxide, and sodium salt of hydroxymethanesulfinic acid or hydrogen peroxide and ascorbic acid and, in particular systems which moreover contain a small amount of a metal compound which is soluble in the polymerization medium and whose metallic component may occur in a plurality of valency states, e.g. ascorbic acid/iron(II) sulfate/hydrogen peroxide, the sodium salt of hydroxymethane sulfinic acid, sodium sulfite, sodium hydrogen sulfite or sodium disulfite frequently also being used instead of ascorbic acid, and tert-butyl hydroperoxide or alkali metal peroxodisulfates and/or ammonium peroxodisulfate instead of hydrogen peroxide. Photoinitiators are also suitable. Furthermore, the polymerization may be initiated by ionizing radiation or electrochemically. The amount of initiators is in general from 0.1 to 5% by weight, based on the total weight of the polymers to be polymerized.

The molecular weight of the polymer can, if desired, be reduced in a conventional manner by adding regulators to the polymerizing mixture. Suitable regulators are, for example, mercaptans.

The polymerization is usually carried out under an inert gas atmosphere. It may be carried out, for example, by initially taking all components which are present during the polymerization in a polymerization vessel, initiating the reaction and, if required, cooling the reaction mixture in order to control the polymerization temperature. In another possible procedure, only individual components or a part of the components are or is initially taken, the polymerization is initiated and the remainder of the components are metered in individually or together, continuously or stepwise, if necessary at different intervals. It is also possible to adopt a procedure in which the monomers and the polymerization initiator are introduced in separate feeds, stepwise or continuously, into the polymerization vessel. Different monomers or monomer mixtures may furthermore be added in succession to the reaction mixture.

The temperature during the polymerization is in general from 40 to 160° C., preferably from 50 to 120° C. It may change during the reaction. The polymerization is preferably carried out under atmospheric pressure but may also be effected under reduced or superatmospheric pressure. If the polymerization temperature is above the boiling point of a component, the polymerization is carried out in a pressure-resistant apparatus at up to 20 bar.

The particle size of the polymer formed is in general from 50 nm to 20 μm. Some of the particles may be present as loose associates which can be readily broken up. In general, however, the fine fraction is very large.

The particle size of the polymer can be influenced by the design and mode of operation of the stirring units used and by additives. When conventional stirrers or mixing systems are used, the particle size is in general in the abovementioned range.

After the polymerization process, the polymers may be subjected to a physical or chemical aftertreatment, in particular for removal of volatile components, for example residual monomers. Such methods are, for example, steam distillation, stripping with steam and/or nitrogen, concentration, oxidative treatment or addition of polymerization initiators.

The polymer dispersions obtained can be used as such. They have been found to have an extremely long shelf life.

The polymers obtained can also be isolated, for example by spray drying or drum drying. A particular advantage is that the polymers can be precipitated from the dispersion in a simple manner by reducing the viscosity. This can be effected by adding a small amount of an electrolyte or of an organic, water-miscible solvent or by dilution with water. The chosen polymers can then be isolated, if necessary dried and further processed. Electrolytes suitable for the precipitation are, for example, the sodium and potassium salts of mineral acids, in particular sodium chloride and sodium sulfate. However, magnesium salt or calcium salts, for example magnesium sulfate or calcium formate, are also suitable. Suitable organic water-miscible solvents are in particular $C_1$–$C_4$-alcohols, diols, water-soluble carboxylic acids and acetone.

The polymers or polymer dispersions obtainable according to the invention are widely used. For example, they may be used as adhesives, as assistants for the building industry (addition to cement), as binders, for example for surface coatings or materials for coating leather, as impact modifiers in engineering polymers or as paper assistants.

The examples which follow illustrate the invention without restricting it. The following gel-forming polymers were used:

Polymer 1 Copolymer of acrylic acid (>95%), stearyl methacrylate and pentaerythrityl triallyl ether. Sold under the tradename Pemulen TR 1® from B. F. Goodrich.

Polymer 2 Copolymer of acrylic acid (>94%), stearyl methacrylate and pentaerythrityl triallyl ether. Sold under the tradename Pemulen TR 2® from B. F. Goodrich.

Polymer 3 Slightly crosslinked polyacrylic acid, sold under the tradename Carbopol® 940 from B. F. Goodrich.

Polymer 4 Copolymer of ethyl acrylate, methacrylic acid and a methacrylate of a stearyl alcohol reacted with 25 ethylene oxide units, in a weight ratio of 55/40/5, having a K value of 95 (0.1% strength in THF).

Polymer 5 Slightly crosslinked sodium salt of polyacrylic acid, sold by BASF AG under the tradename Lutexal® P.

Polymer 6 Terpolymer of maleic anhydride and methyl vinyl ether (in a weight ratio of about 60/40) and 1,9-decadiene, sold under the tradename Stabileze 06 by ISP.

All viscosities were determined at 25° C. using a Haake VT 02 hand viscometer.

EXAMPLE 1

A gel was formed from 600 ml of water, 1.8 g of polymer 1 and 0.8 g of sodium hydroxide in a 2l stirred apparatus. The viscosity of the aqueous phase was 3200 mPa.s. After the addition of 0.3 g of sodium persulfate, the mixture was heated to 80° C. in a stream of nitrogen while stirring with an anchor stirrer at 200 rpm. At this temperature, 142.5 g of ethyl acrylate and 7.5 g of methacrylic acid were run in over 3 hours. The mixture was then kept at this temperature for a further 3 hours. A white polymer dispersion having a solids content of 19.5% was obtained. The viscosity of the dispersion was 7 Pa.s. Even after 9 months, there was no tendency for phase separation. After the addition of a solution of 0.5 g of NaCl in 50 ml of water to 50 ml of the dispersion, the latter coagulated in fine flocks which were easy to isolate.

After 10 ml of the dispersion had been stirred into 100 ml of water, the polymer settled out slowly as a finely divided precipitate.

EXAMPLE 2

A similar reaction was carried out with 1.8 g of polymer 2 instead of polymer 1. The viscosity of the aqueous phase was 1400 mPa.s. A white dispersion having a solids content of 19.7% and a viscosity of 7 Pa.s was obtained. Even after 9 months, there was no tendency for phase separation.

EXAMPLE 3

A similar reaction was carried out with 1.8 g of polymer 3 instead of polymer 1. The viscosity of the aqueous phase was 13,000 mPa.s. A white dispersion having a solids content of 19.9% and a viscosity of 1.7 Pa.s was obtained. Even after 9 months, there was no tendency for phase separation.

EXAMPLE 4

A similar reaction was carried out with 4 g of polymer 4 instead of polymer 1. The viscosity of the aqueous phase was 1700 mPa.s. A white dispersion having a solids content of 19.6% and a viscosity of 1.7 Pa.s was obtained. Even after 9 months, there was no tendency for phase separation. After the addition of 10 ml of ethanol to 50 ml of the dispersion, the polymer settled out slowly as fine particles.

EXAMPLE 5

A similar reaction was carried out with 3 g of polymer 5 instead of polymer 1. The viscosity of the aqueous phase was 11,000 mPa.s. No further base (NaOH) was added. A white dispersion having a solids content of 19.6% and a viscosity of 1.7 Pa.s was obtained. Even after 9 months, there was no tendency for phase separation.

EXAMPLE 6

A similar reaction was carried out with 1.8 g of polymer 6 instead of polymer 1. The viscosity of the aqueous phase was 17,000 mPa.s. A white dispersion having a solids content of 20.1% and a viscosity of 8 Pa.s was obtained. Even after prolonged standing, there was no tendency for phase separation.

EXAMPLE 7

A similar reaction was carried out with 150 g of ethyl acrylate instead of the monomers used in Example 1. A white dispersion having a solids content of 20.3% and a viscosity of 9.5 Pa.s was obtained. Even after 9 months, there was no tendency for phase separation.

EXAMPLE 8

A similar reaction was carried out with 150 g of methyl methacrylate instead of the monomers used in Example 1. A white dispersion having a solids content of 21.0% and a viscosity of 25 Pa.s was obtained. Even after 9 months, there was no tendency for phase separation.

EXAMPLE 9

A similar reaction was carried out with 150 g of styrene instead of the monomers used in Example 1. The monomer phase being added to the reaction mixture in the course of 6 hours. A white dispersion having a solids content of 19.8% and a viscosity of 6 Pa.s was obtained.

EXAMPLE 10

A similar reaction was carried out with 150 g of n-butyl acrylate instead of the monomers used in Example 1. A stable, white dispersion having a solids content of 20.2% and a viscosity of 4 Pa.s was obtained.

We claim:

1. A process for the preparation of a water-insoluble polymer by free radical emulsion polymerization of at least one ethylenically unsaturated monomer, wherein said ethylenically unsaturated monomer comprises at least one monomer which is substantially water-insoluble and optionally one or more comonomers wherein the polymerization is carried out in an aqueous gel phase having a viscosity of at least 800 mPa.s; wherein the gel former has an average molecular weight of more than 20,000; and wherein the gel former is an anionic carboxyl-carrying polymer of synthetic origin.

2. A process as claimed in claim 1, wherein the gel former used is a carboxyl-carrying polymer which comprises units which are selected from the group consisting of monoethylenically unsaturated, aliphatic $C_3$–$C_8$-carboxylic acids, the anhydrides thereof and mixtures of the carboxylic acids and anhydrides.

3. A process as claimed in claim 2, wherein the gel former used is a carboxyl-carrying polymer which comprises units which are selected from the group consisting of acrylic acid, methacrylic acid, maleic acid, fumaric acid, itaconic acid, crotonic acid, methacrylic anhydride and maleic anhydride.

4. A process as claimed in claim 1, wherein the gel former used is a carboxyl-carrying polymer which is composed of
   a) from 20 to 100% by weight of at least one carboxyl-carrying monomer;
   b) from 0 to 80% by weight of at least one $C_1$–$C_{30}$-alkyl (meth)acrylate;
   c) from 0 to 10% by weight of at least one crosslinking agent;
   d) from 0 to 70% by weight of at least one further monoethylenically unsaturated monomer and
   e) from 0 to 25% by weight of at least one monoethylenically unsaturated monomer which has a water miscibility of at least 1% by weight at 25° C. and has at least one alkyl group of 12 or more carbon atoms.

5. A process as claimed in claim 4, wherein the carboxyl-carrying polymer is composed of
   a) from 20 to 80% of at least one carboxyl-carrying monomer;
   b) from 20 to 80% of at least one $C_1$–$C_{30}$-alkyl (meth)acrylate;
   c) from 0 to 1% of at least one crosslinking agent;
   d) from 0 to 30% of at least one further monoethylenically unsaturated monomer and
   e) from 0.5 to 15% of at least one monoethylenically unsaturated monomer which has a water miscibility of at least 1% by weight at 25° C. and has at least one alkyl group of 12 or more carbon atoms.

6. A process as claimed in claim 5, wherein a compound of the formula

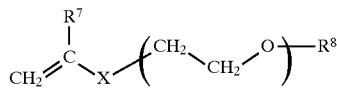

where
R$^7$ is H or CH$_3$,
X is —O—, —COO—, —CONH— or —CH$_2$—,
R$^8$ is $C_{12}$–$C_{22}$-alkyl and
n is from 1 to 100,
is used as the monoethylenically unsaturated monomer (e).

7. A process as claimed in claim 4, wherein the gel former used is a carboxyl-carrying polymer which is composed of
   a) from 30 to 100% of at least one carboxyl-carrying monomer;
   b) from 0 to 20% of at least one $C_1$–$C_{30}$-alkyl (meth)acrylate;
   c) from 0 to 10% of at least one crosslinking agent and
   d) from 0 to 70% of at least one further monoethylenically unsaturated monomer.

8. A process as claimed in claim 7, wherein the gel former used is a carboxyl-carrying polymer which is composed of
   a) from 80 to 99.9% of acrylic acid, methacrylic acid or maleic anhydride;
   b) from 0.05 to 10% of at least one $C_8$–$C_{22}$-alkyl (meth)acrylate;
   c) from 0.05 to 5% of at least one crosslinking agent and
   d) from 0 to 10% of at least one further monoethylenically unsaturated monomer.

9. A process as claimed in claim 8, wherein the gel former used is a carboxyl-carrying polymer which is composed of
   a) from 90 to 99.4% of acrylic acid, methacrylic acid or maleic anhydride;
   b) from 0.5 to 5% of a $C_8$–$C_{22}$-alkyl (meth)acrylate;
   c) from 0.1 to 5% of at least one crosslinking agent and
   d) from 0 to 5% of at least one further monoethylenically unsaturated monomer.

10. A process as claimed in claim 4, wherein the gel former used is a carboxyl-carrying polymer which is composed of
    a) from 95 to 99.95% of acrylic acid, methacrylic acid or maleic anhydride and
    b) from 0.05 to 5% of at least one crosslinking agent.

11. A process as claimed in claim 4, wherein the gel former used is a carboxyl-carrying polymer which is composed of
    a) from 40 to 65% of maleic anhydride,
    b) from 35 to 60% of at least one $C_1$–$C_{22}$-alkyl vinyl ether or of a $C_6$–$C_{30}$-alk-1-ene or isobutene,
    c) from 0 to 5% of at least one crosslinking agent and
    d) from 0 to 10% of at least one further monoethylenically unsaturated monomer.

12. A process as claimed in claim 4, wherein the gel former used is a carboxyl-carrying polymer which is composed of
    a) from 40 to 85% of (meth)acrylic acid,
    b) from 15 to 60% of at least one N-vinyllactam or of an acrylamide,
    c) from 0 to 5% of at least one crosslinking agent and
    d) from 0 to 10% of at least one further monoethylenically unsaturated monomer.

13. A process as claimed in claim 1, wherein a carboxyl-carrying polymer in which some or all of the carboxyl groups are present as carboxylate groups is used.

14. A process as claimed in claim 1, wherein the gel former is used in an amount of from 0.05 to 10, in particular from 0.1 to 5, particularly preferably from 0.1 to 2, % by weight, based on the total weight of the gel phase.

15. A process as claimed in claim 1, wherein the viscosity of the gel phase is at least 1500, in particular at least 1000, mPa.s.

16. A process as claimed in claim 1, wherein the polymer obtained is precipitated by adding water or a water-miscible solvent or an electrolyte.

17. An aqueous polymer dispersion obtained by a process as claimed in claim 1, comprising:

at least one carboxyl-carrying polymer A of synthetic origin in its anionic salt form having an average molecular weight of more than 20,000; and wherein the gel former is an anionic carboxyl-carrying polymer of synthetic origin and at least one particulate polymer B being different from polymer A, said polymer B being substantially composed of a water-insoluble monomer and, optionally, a water-soluble comonomer in minor amounts; and wherein said polymer B has a particle size ranging from 50 nm to 20 µm.

* * * * *